Patented Mar. 6, 1934

1,949,466

UNITED STATES PATENT OFFICE 1,949,466

PROCESS FOR INDICATING THE PRESENCE OF TOXIC SUBSTANCES

Ludwig Gassner, Frankfort-on-the-Main, Germany, assignor, by mesne assignments, to Deutsche Gesellschaft für Schädlings-Bekämpfung, m. b. H., Frankfort, Germany, a corporation of Germany No Drawing. Application January 12, 1929, Serial No. 332,235. In Germany January 16, 1928

2 Claims. (Cl. 167—35)

This invention is concerned with making known the presence of poisonous gases or vapors, and is of particular value in the case of gases which are imperceptible or only slightly perceptible, as for example hydrocyanic acid and the like.

It has already been proposed to employ warning and irritant substances with the poisonous gases or vapors for the purpose of reducing the danger accompanying its handling or its use, as for example in combating pests. However, years of practice have shown that even by the use of poisonous gases mixed with an irritant substance there are still considerable sources of danger present. In many cases the fumigation with poisonous gases is already fully in progress while at the same time the warning or irritating substance has not yet put in its appearance or is present in insufficient amounts for any practical value. The result of this is, that men or animals can enter into a fumigated room or space without being warned of the presence of poisonous gas. In other cases it has been shown, although during the gasification by means of the toxic substance the warning and irritating substances were sufficiently detectable, that by terminating the gasification or fumigation, as for example by ventilation of the closed space, or after the ventilation, there are still dangerous quantities of poisonous gases present while the irritating substance has already disappeared. This is the case particularly when dealing with a space which contains corners or is obstructed by furniture or other objects, or when there are objects in the space being gassed which are able to retain large quantities of poison gas for long periods of time, as for example upholstered furniture and the like.

I have now found that a highly effective and very safe process of fumigation results from the addition of at least two warning or irritating substances to a poison gas which is imperceptible or only slightly perceptible and in which one of the added substances is so volatile that it is sure to be present at the beginning of the gasification while the other has the property of remaining in the gassed space until even the last dangerous quantities of toxic gas have safely disappeared. It is a remarkable fact that such a combination not only warns of the presence of the first quantities and then of the remaining quantities of poisonous gas, but also has a sustained warning action over the entire period of fumigation even though the difference between the volatility as well as the diffusing power of the two irritants is very great. As "forewarners" in the sense of my invention, easily volatile and quickly diffusing irritating or warning substances come into consideration. These should also spread more quickly and should penetrate more easily through pores, cracks and other openings than the poison gas itself. For example, when using hydrogen cyanide as the fumigant, cyanogen chloride, cyanogen bromide, and the like have proved useful as "forewarners".

These substances which I use as "afterwarners" in the sense of my invention are those which are difficult to diffuse and which volatilize more slowly than the regular poisonous gas. Substances such as bromacetophenone, chloropicrin, bromoacetic acid, such as the ethyl ester, and the like may be used as "afterwarners".

In one example of my invention I have used hydrogen cyanide as the regular fumigant and have added to it cyanogen chloride and bromoacetophenone in quantities sufficient to produce a safe irritating action. In general, I have found that 1 to 3% by weight of each of the two types of irritating substance has proved sufficient to safely permit of the desired reliable warning action being produced. However, more or less than this amount may be used, depending upon the margin of safety desired and the properties of the irritants used. One can use even more than two irritating substances provided at least one is a "forewarner" and the other is an "afterwarner".

The volatile, slightly perceptible or entirely imperceptible poisonous substance, for example hydrogen cyanide can be used in the form of its mixture, with the irritating "forewarners" and "afterwarners", whether the mixture is in the form of a liquid which is to be vaporized at the point of fumigation or whether it is distributed on inert porous or finely divided absorptively acting carrier substances, as for example infusorial earth, diatomite, coke, cellulose and the like. By the use of the last above mentioned method, the giving off of the volatile constituents is considerably facilitated.

Finally, one can use such substances in my invention as those which contain the volatile poisonous substance in the combined state and which evolve the same only after decomposition. An example of such a substance is calcium cyanide or the like, which gives up hydrogen cyanide upon contact with the moisture of the air. When such substances are used in my invention they are combined with "forewarners" and "afterwarners" as described above.

What I claim is:

1. A method of fumigating which comprises causing vaporization of a mixture containing liquid hydrocyanic acid having intermingled therewith a substance having a higher vapor pressure and a substance having a lower vapor pressure than hydrocyanic acid, said substances operating as warning agents, said substances co-operating so that the rate of vaporization thereof and the consequent warning effect provides a sufficient concentration of vapors to effect warning throughout the period in which a toxic concentration of hydrocyanic acid exists.

2. A fumigating composition comprising a mixture containing liquid hydrocyanic acid having intermingled therewith a substance having a higher vapor pressure and a substance having a lower vapor pressure than hydrocyanic acid, said substances operating as warning agents, said substances cooperating so that the rate of vaporization thereof and the consequent warning effect provides a sufficient concentration of vapors to effect warning throughout the period in which a toxic concentration of hydrocyanic acid exists.

LUDWIG GASSNER.